Patented Feb. 23, 1954

2,670,300

UNITED STATES PATENT OFFICE 2,670,300

COLOR STABLE PORCELAIN ENAMEL AND METHOD OF PRODUCING SAME

Gordon H. Johnson and Joseph F. Wuellner, Cleveland, Ohio, assignors to Ferro Corporation, a corporation of Ohio No Drawing. Application January 4, 1951, Serial No. 204,474

5 Claims. (Cl. 106—48)

This invention relates as indicated to a color-stable porcelain enamel and to a method for producing the same and has particular reference to titanium-opacified porcelain enamels which are colored by pigments containing chromium.

It is well known to those skilled in the art of porcelain enamel manufacture, that porcelain enamels which contain titanium dioxide as their opacifying agent show a marked appearance change over a range of firing temperature when pigmented or colored. This lack of color stability is particularly noticeable when these titanium-opacified enamels are colored by pigments containing chromium. For instance a titanium-opacified enamel which is colored by a blue-green pigment, which contains chrome, becomes increasingly greener as the firing temperature increases.

It is therefore the principal object of our invention to provide a method for stabilizing this color change in porcelain enamels.

Other objects will become apparent as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises a color-stable porcelain enamel which comprises a titanium-opacified porcelain enamel having smelted therein a minor amount of a chromium oxide-bearing material, said porcelain enamel being colored by a pigment containing chromium.

In the following description of our invention reference will be had to certain phraseology by which the color characteristics of porcelain enamels will be described. So as to avoid confusion and so that the present invention will be more clearly understood the technical phraseology will herein be defined.

At present, there is a wide divergence between the methods used in color recording and reporting and an equal divergence in methods of color measurement.

As a consequence it is deemed advisable to use a "color language" which can be used and understood by those concerned with the use of colored materials.

Unless we delve somewhat deeply into its physics and psychology, the language of color is comparatively simple.

Any color can be completely described in terms of three properties: lightness, hue and saturation.

Lightness tells how much of the light falling upon an object is reflected by it or transmitted through it.

Hue is the quality of this reflected or transmitted light, whether it is red, yellow or blue, or some intermediate.

Saturation is the purity or strength of the hue, that is, how far it departs from a neutral gray of the same lightness.

Black, all neutral grays and white, have no hue, and are called achromatic, to distinguish them from chromatic colors such as red, yellow or blue. They have only one of the attributes of color, that is, lightness.

The hue and saturation of a color, taken together, are termed its chromaticness and when we have measured them we have measured its chromaticity.

One of the most convenient instruments for approximate color measurements is the Hunter multipurpose reflectometer, using its standard amber green and blue filters. This is the instrument used to obtain the data for the present invention and is so completely described in the literature, that it is deemed not necessary to dwell on its theory, construction, or operation.

The photo-electric tristimulus values obtained from the amber, blue and green filters of the Hunter instrument are interpreted by mathematical formulae into lightness, saturation and hue angle.

Color stability of a poreclain enamel over a firing range is best defined as a minimum of color difference over the firing range. We have found the formulae of Robertson and Milligan (American Ceramic Society, vol. 20, No. 11, November 1941, pages 387–391) to be one of most direct and most easily understood set of formulae for illustrating this aforementioned color difference. Where ΔE or color difference is given by $$(\Delta E)^2 = (\Delta L)^2 + (\Delta Y)^2 + (\Delta G)^2$$

where $$L = \sqrt{G} \times 100$$
$$Y = \frac{A-B}{A+G+B} \times 100$$
$$G = \frac{-2A + 2.5G - 0.5B}{A+B+G} \times 100$$

where A, G and B are the readings taken with the Hunter multipurpose reflectometer and tristimulus filters amber, green and blue respectively.

It is our theory that when a pigment containing chrome is added to a porcelain enamel opacified with titanium dioxide the chromium of the pigment, during the firing cycle, is partially absorbed by the titanium crystal and at different temperatures a different amount of chromium is absorbed.

We have found for all practical purposes that if any two of the three factors, which make up color, can be controlled it is possible to produce a colored material of minimum color difference. In other words if the lightness and hue or hue and saturation etc. are kept from varying over a firing range the resultant porcelain enamels will have a low color difference. By studying the Hunter readings obtained on porcelain enamel made according to our invention we have found the above to be the case.

However, we do not wish to be held by this theory since regardless of the validity of our theory we are able to control the color stability of the porcelain enamel.

We have found that if from about .03% to about 1.0% of $Cr_2O_3$ based on the total batch weight, is added as a smelter addition a frit is produced which is substantially color-stable. It is to be understood that materials other than $Cr_2O_3$ may be used. Such substances as the alkali chromates, chrome-bearing rutile etc. have been found to be useful in practicing our invention. In the preferred embodiment of our invention we use about 0.125% of $Cr_2O_3$ based on the total batch weight as a smelter addition.

So that the aforegoing is more readily understood the following examples are given:

Example I

Two porcelain enamel frits A and B containing about 20% titanium dioxide as an opacifier were smelted under identical conditions, (A) frit was smelted without the addition of any $Cr_2O_3$ and (B) frit was smelted with the addition of about 0.125% $Cr_2O_3$ based on the total batch weight.

These frits were then both milled with 1% of a brown, chrome-containing, oxide.

The colored milled frits were then sprayed onto steel work pieces and fired over a firing range of from 1450° F. to 1550°.

The 1450° F. panel containing frit A gave a Hunter reading of amber 0.429, blue 0.340 and green 0.388. The 1550° F. panel containing frit A gave a Hunter reading of amber 0.543, blue 0.320 and green 0.488.

These Hunter readings when used in the aforegoing formulae show that frit A has a color difference or $\Delta E$ of 12.13.

The 1450° F. panel containing frit B gave a Hunter reading of amber 0.502, blue 0.272 and green 0.443. The 1550° F. panel containing frit B gave a Hunter reading of amber 0.535, blue 0.276 and green 0.475.

These readings show a $\Delta E$ of 3.00.

Therefore it can be readily seen that the frit made according to our invention is 4 times more color-stable than the frit made according to prior art practice.

Example II

The same procedure as in Example I was used except that 1% of a blue-green, chrome-containing oxide was used.

Frit A showed a $\Delta E$ of 26.69 and frit B showed a $\Delta E$ of 4.06. By following the teachings of the present invention a frit was produced which was 6.6 times more color-stable than a frit made according to prior art practices.

Example III

The same procedure as in Example I was followed using a formula containing about 12.5% titanium dioxide as the opacifying agent. These frits were pigmented with 1% of a green, chrome, oxide.

Frit A showed a $\Delta E$ of 4.91 and frit B showed a $\Delta E$ of 1.45. Or in other words the frit produced by the teachings of the present invention was 3.38 times as color-stable as the frit made according to prior practices.

In the foregoing specification and appended claims we refer to a porcelain enamel opacified by titanium dioxide. We have found that about 10% of $TiO_2$, based on total batch weight, is a minimum amount of titanium which will crystalize out to produce opacification and that about 20% of $TiO_2$ will produce maximum opacity. Therefore it is to be understood that in our specification and claims a porcelain enamel opacified by titanium dioxide is one which contains about 10% to about 20%, based on the total batch, of $TiO_2$.

Reference is made throughout the specification to pigments containing chrome, the following formulae are offered as typical examples of such pigments:

|  | Per cent |
|---|---|
| $Fe_2O_3$ | 33.3 |
| $Cr_2O_3$ | 33.3 |
| ZnO | 33.3 |

The above is an example of a typical brown, chrome-containing, pigment.

|  | Per cent |
|---|---|
| $Co_2O_3$ | 27.3 |
| $Al_2O_3$ | 54.6 |
| $Cr_2O_3$ | 13.6 |
| ZnO | 4.5 |

This latter formula is a typical example of a blue-green, chrome-containing, pigment.

Pigments of the foregoing type are usually added to porcelain enamels in the amounts of from about 0.1% to about 10%.

These pigments regardless of their $Cr_2O_3$ content or regardless of the total amount pigment added, when added to $TiO_2$-opacified enamels cause the enamels to undergo a marked color change over a firing range. However, when following the teachings of our invention this previously mentioned difficulty is overcome.

In the preferred embodiment of our invention we use about 0.03% to 1.0% of $Cr_2O_3$ as the stabilizing agent. However, if other chrome-bearing materials, such as, the alkali chromates, chrome-containing rutile, etc. are used the amount of such material used is based on their chrome content. That is, the material added is added in the amount that will yield an equivalent of 0.03% to 1.0% $Cr_2O_3$ to the smelt, based on the total weight of the batch.

Other modes of applying the principle of the invention may be employed, change being made as regards the details described, provided the features stated in any of the following claims or the equivalent of such be employed.

We therefore particularly point out and distinctly claim as our invention:

1. A porcelain enamel which is substantially color-stable over a firing range which comprises a porcelain enamel containing from about 10% to about 20% of titanium dioxide opacifier, an amount of chrome-bearing material which contains an equivalent of from about 0.03% to about 1.0% of $Cr_2O_3$ and from about 0.1% to about 10% of a pigment containing chrome.

2. The method of producing a porcelain enamel which is substantially color-stable over a firing range which comprises smelting a titanium dioxide opacified enamel with an amount of a chrome-bearing material which contains an equivalent of from about 0.03% to about 1% of $Cr_2O_3$, fritting said smelted enamel, milling said frit with from about 0.1% to about 10% of pigment containing chrome and firing said milled enamel on a work piece.

3. The method in claim 1 in which the chrome bearing material is $Cr_2O_3$.

4. The method in claim 1 in which the chrome bearing material is an alkali chromate.

5. The method of producing a porcelain enamel which is substantially color stable over a firing range which comprises smelting a titanium dioxide opacified enamel with from about .03% to about 1.0% of a chrome bearing material, fritting said smelted enamel, milling said frit with about 0.1% to about 10% of a pigment containing chrome and then firing said milled enamel on a work piece.

GORDON H. JOHNSON.
JOSEPH F. WUELLNER.

References Cited in the file of this patent

UNITED STATES PATENTS

| Number | Name | Date |
|---|---|---|
| 2,255,044 | Deyrup | Sept. 9, 1941 |
| 2,337,103 | Heimsaeth et al. | Dec. 21, 1943 |
| 2,405,261 | Levi | Aug. 6, 1946 |

FOREIGN PATENTS

| Number | Country | Date |
|---|---|---|
| 9,611 | Great Britain | 1893 |